(12) United States Patent
Rayner

(10) Patent No.: US 6,851,217 B1
(45) Date of Patent: Feb. 8, 2005

(54) FISHING LINE WEIGHT THAT DETACHES FROM LINE

(76) Inventor: Brian Kevin Rayner, 306 Grand Canal, Balboa Island, CA (US) 92262

(*) Notice: Subject to any disclaimer, the term of this patent is extended or adjusted under 35 U.S.C. 154(b) by 0 days.

(21) Appl. No.: 10/732,546

(22) Filed: Dec. 10, 2003

(51) Int. Cl.$^7$ .............................................. A01K 91/00
(52) U.S. Cl. ...................................... 43/43.12; 43/449
(58) Field of Search .............................. 43/43.12, 44.7, 43/44.91

(56) References Cited

U.S. PATENT DOCUMENTS

| | | | |
|---|---|---|---|
| 2,687,592 A | * | 8/1954 | Purcell ....................... 43/43.12 |
| 3,081,574 A | | 3/1963 | Wise |
| 3,180,051 A | * | 4/1965 | Freeman .................... 43/43.12 |
| 3,393,467 A | * | 7/1968 | Potter et al. ............... 43/43.12 |
| 3,415,005 A | | 12/1968 | Gilham |
| 3,426,469 A | * | 2/1969 | Lee et al. ................... 43/43.12 |
| 3,513,583 A | * | 5/1970 | Leash et al. ............... 43/43.12 |
| 3,680,250 A | * | 8/1972 | Hetrick ....................... 43/54.1 |
| 3,834,059 A | | 9/1974 | Overstreet |
| 3,854,235 A | | 12/1974 | Thompson |
| 4,058,926 A | * | 11/1977 | Harrigan .................... 43/43.12 |
| 4,186,907 A | | 2/1980 | Snodgrass |
| 4,286,403 A | * | 9/1981 | Rogers ....................... 43/43.12 |
| 4,616,441 A | * | 10/1986 | Dmytriw .................... 43/44.91 |
| 4,663,881 A | * | 5/1987 | Follett ........................ 43/43.12 |
| 4,910,908 A | | 3/1990 | Rosenburg |
| 5,031,351 A | * | 7/1991 | Rogel .......................... 43/44.9 |
| 5,511,338 A | * | 4/1996 | Costanzo ................... 43/42.28 |
| 5,890,316 A | * | 4/1999 | Rodgers et al. ............ 43/43.16 |

* cited by examiner

Primary Examiner—Teri P. Luu
Assistant Examiner—Jordan Lofdahl
(74) Attorney, Agent, or Firm—Brian Kevin Rayner

(57) ABSTRACT

A means to cast a fishing bait or lure using a weight on your fishing line which eliminates the disadvantages of weight on the line. This is achieved by the use of a weight, so configured that it detaches from fishing line instantly or over time, depending on preference, upon contact with water. The configuration of the weight is 2 equal bodies of clay held together by water-soluble adhesive tape. The amount of tape determines the amount of time the weight stays attached to the line. The identical clay bodies have a tab and slot on the mating surface of the bodies to prevent slippage. There is a groove down the longitudinal axis of the bodies, which forms a hole for fishing line when the bodies are joined together. This weight is easily attached to the line using the hole formed.

5 Claims, 1 Drawing Sheet

FISHING LINE WEIGHT THAT DETACHES FROM LINE

BACKGROUND

1. Field of Invention

This invention relates generally to fishing line weights, and more specifically to a fishing line weight that detaches from fishing line, in a controllable amount of time, either instantly or longer, in the water following casting of the fishing line. The purpose of the invention is to eliminate various problems encountered when fishing with traditional line weights.

2. Discussion of Prior Art

Weights added to a fishing line to allow the fisherman to throw his bait further are well known in the prior art. The ability to cast bait further increases the area of water fished. However, there are some negative aspects of having a weight permanently attached to the fishing line. One problem is that if the fish are on or near the surface, the weight will pull the bait below where the fish are located. Also, when fishing with a tight line and a weight located below the baited hook, fish are reluctant to make a substantial strike when they sense the resistance caused by the weight on the line. Often when a weight is employed above the baited hook, the fisherman retrieves a bare hook because the weight prevents him from sensing a fish feeding on the bait.

Another problem is snags caused by weights catching on submerged weeds and other debris as the line is being retrieved. Not only do such snags cause the loss of weights, hooks, swivels, and lures but also the attendant time re-rigging the line.

Inventors have created several different types of fishing line weights to overcome the negative aspects of having said weight permanently attached to said line. U.S. Pat. No. 4,910,908 to Rosenburg (1990) discloses a water-soluble weight consisting of baking powder; however this method is ineffective due to said weight remaining on the line for an extended period of time and due to the disturbance in the water created by the baking powder dissolving. Rosenburg's weight is further limited by lack of an easy method of manufacture, the fact that it is difficult to use, and it has poor strength to stay on the line with casting. U.S. Pat. No. 4,186,907 to Snodgrass (1980) and U.S. Pat. No. 3,415,005 Gilham (1968) show a weight consisting of ice attached to line via rubberbands or strings. These weights made of ice encounter the same extended dissolving period problem as Rosenburg. Additionally, said ice weights must constantly be stored at temperatures below freezing until use, many fishing areas are located far from devices that may be used to keep these types of weights frozen.

U.S. Pat. No. 3,854,235 to Thompson (1974) discloses a weight consisting of a marble wrapped in water-soluble paper which is tied directly to the fishing line. This invention is inconvenient because it requires assembly at time of use. It is also impractical because assembly requires dry hands, whereas when fishing one's hands are typically wet. Furthermore, this weight has a lack of durability caused by being directly attached to the line with fragile paper, which tends to come apart during casting of the line.

Encountering the same extended dissolving time problem as Rosenberg and Snodgrass is U.S. Pat. No. 3,834,059 to Overstreet (1974) which consists of a sugar cube wedge in a cement casing. This weight lacks the durability to withstand the forces of casting the fishing line. This type of weight also has the problem of being difficult to manufacture.

U.S. Pat. No. 3,081,574 to Wise (1963) describes use of a complex series of lines, looped knots, and a clip to facilitate attachment and release of fishing weight. Due to the complexity of this design, it requires special knot-tying skills. The attaching clip tends to remain on the fishing line upon release of the weight, which is undesirable. Additionally, this method was shown to typically use non-environmentally friendly materials as the weighted portion.

SUMMARY

The principal object of the present invention is to provide a weight for fishing line that either instantly or over a period of time, depending on preference, dissolves in the water once the baited fishing line has been cast to the desired location. While this invention provides the sane weight advantages as conventional weights to permit the fisherman to cast a desired distance, it eliminates the disadvantages that are associated with other weights.

OBJECTS AND ADVANTAGES

Accordingly, besides the objects and advantages of fishing line weights that release upon contact with water described in the background of the invention, several objects and advantages of the present invention are:

A) to provide a fishing line weight that can instantly release from a fishing line upon contact with water B) To provide a fishing line weight where the time that the weight releases from the fishing line can range from instantaneous to hours, depending on the amount of water-soluble tape used to connect the two halves. This allows for varying depths of bait placement.

C) To provide a fishing line weight that is easy and convenient to use.

D) To provide a fishing line weight that is pre-assembled. All the angler has to do is attach said weight directly to the fishing line without any special knot-tying skills or separate attaching devices.

E) To provide a fishing line weight that is very durable compared to other similar weights. Because of how it is assembled and the materials used, there is no need to keep it at a temperature below freezing or worry about it coming apart during casting of the weight.

F) To provide a fishing line weight that is attached to the line in a strong enough manner that it will not detach from the line during the act of flinging or casting the weight and line away from the angler.

G) To provide a fishing line weight that is non-toxic and safe for the environment.

H) To provide a detachable fishing line weight which is simple and easy to manufacture.

Further objects and advantages are to provide a fishing line weight which can be used easily to cast a bait a desired distance, which instantly or over time detaches from the line upon contact with the water. This weight can be supplied to the fisherperson in a pre-assembled state, which requires no expertise to use properly. Furthermore the weight is very similar to the size and shape of conventional fishing line weights.

DRAWING FIGURES

REFERENCE NUMERALS IN THE DRAWING

| 10. Body | 12. Tab | 14. Slot |
|---|---|---|
| 16. Groove | 18. Water-soluble adhesive tape | 20. Hole |
| 22. Weight | 24. Mating Surface | 26. Line |

DESCRIPTION OF THE INVENTION

Figure 1A:
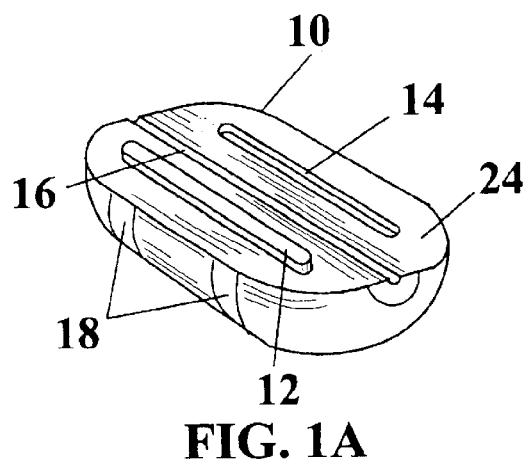
FIGS. 1a and 1b is a perspective view of the two halves, separated apart showing the internal structure of said halves, which form the final product of FIG. 2.
Figure 1B:
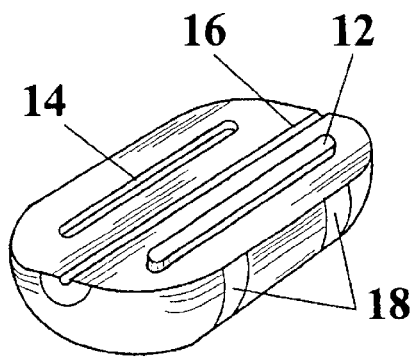

A typical embodiment of the present invention's 2 identical halves are depicted in figure FIG. 1A and FIG. 1B. Each body 10 is an exact image of the other. To form a completed weight as seen in FIG. 2, 2 identical bodies 10 are joined together to form one weight 22.

The body 10 is typically composed of clay, but may be constructed of any other material that can be molded into two identical halves. It is preferred that the material be negatively buoyant, non-toxic, and harmless to the environment, but these are not required properties of the material. The body 10 is generally in the shape of a barrel, which has been cut in half down its long axis. Thus one side is flat, and the other side is rounded. A groove 16 runs on the flat side through the center of the long axis of said body 10. This groove is generally 3 mm in diameter, but may vary depending on the overall size of the weight. The weight will vary proportionally in size depending on the overall desired weight. For example, a 1-ounce weight will have smaller features than a 2-ounce weight, but the proportions remain the same. Also protruding form the flat side 24 of body 10, on one side of groove 16 is a tab 12. Tab 12 protrudes out from the body 10 2–4 mm depending on the overall desired size of the weight; features vary proportionally as mentioned above. As shown in the drawing, tab 12 does not extend the length of body 10. On the other side of the groove 16 is a slot 14. This slot forms a depression of 2–4 mm into which said tab 12 fits into upon union of the 2 identical bodies 10. This tab and slot construction allows there to be only one body 10 that needs to be constructed. The completed weight is composed of 2 identical bodies put together with the flat side 24 facing one another.

Figure 2:
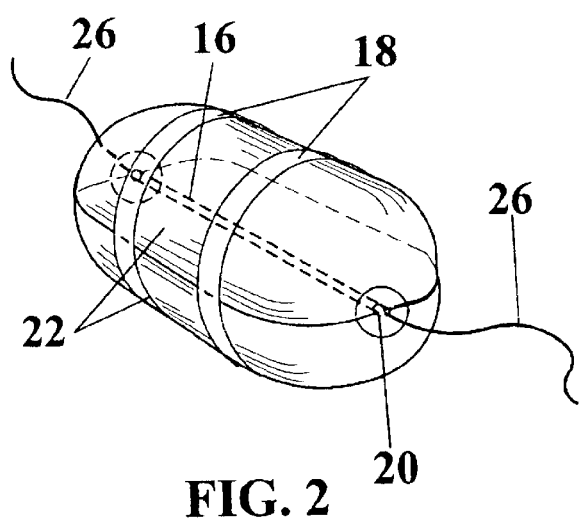
FIG. 2 shows, in perspective, a preferred form of casting weight means in accordance with this invention attached to a fishing line for use, near the bait carrying end of said line.

FIG. 2 shows the preferred embodiment upon union of the 2 identical bodies 10. To hold the 2 bodies 10 together, a single layer of two pieces of water-soluble adhesive tape 18 is wrapped around the outer diameter of both bodies 10. This is depicted in FIG. 2. The use of water soluble adhesive tape 18 is shown in the drawing figures as two separate single layer pieces of tape adhered to the bodies 10. One single piece of tape may also be used, or several layers of one or two pieces of tape would also be satisfactory. This embodiment is composed of two identical clay bodies 10 held together by water-soluble adhesive tape 18. The two bodies 10 are aligned by inserting tab 12 into slot 14. Another aspect of union of bodies 10 is that a hole 20 is formed. Said hole 20 runs longitudinally through a weight 22 as seen in FIG. 2. Hole 20 is made by uniting 2 bodies 10, and is formed from each half of groove 16 as seen in FIGS. 1A and 1B. Also illustrated in FIG. 2 is fishing line 26 which runs through said hole 20. FIG. 2 depicts water-soluble adhesive tape 18, as it is wrapped around the 2 bodies 10. The tape holds the 2 halves together; further stability is provided by the tab 12 and slot 14 as seen in FIGS. 1A and 1B. Depending on how many layers of tape are used, the time for the weight to come apart and detach from the line may be intentionally varied from instantly to several hours depending on preference.

Figure 3:
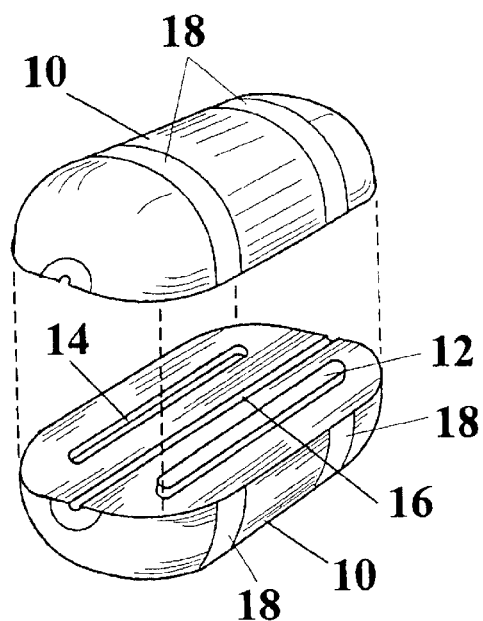
FIG. 3 shows an exploded view of a preferred form of said casting weight, indicating the manner in which the two halves are joined.

FIG. 3 shows the preferred embodiment in an exploded view indicating how said bodies 10 would be joined together to form weight 22.

Operation-FIGS. 1A and 1B, 2,3

The manner of using the fishing line weight 22 in FIG. 2 is similar to that of traditional fishing line weights. There are at least 2 possible methods of attaching the weight to the fishing line. The first way (illustrated in FIG. 2) is to thread the line 26 through hole 20 and then tie the end of the line to a hook, swivel, lure or other piece of terminal tackle. In this manner the weight is held on the line by the terminal tackle. The second way is to already have the terminal hook or lure attached to the line. To attach the weight to the line in this case, one makes a loop in the line by doubling the line back on itself. Then the end of the doubled line, which is the apex of the loop, is inserted into hole 20. The doubled line is inserted all the way through hole 20 on one end so that it protrudes from the other end.

At this point one end of the weight will have a loop of line protruding from hole 20. The other end of the weight will have two strands of line protruding. Next, the body of the weight is inserted into the loop formed by the line. Then the 2 protruding strands of line are pulled tight. In this manner the weight is held securely on the line, with one end of line going towards the rod and reel and the other end of the line going towards the terminal hook or lure.

Using the second method of attachment is more convenient because it enables one to attach the line to the weight without tying any knots or needing to change the terminal lure or hook. Typically the only time one would want to use the first method is at the start of fishing when one had to initially tie a hook or lure onto the line. An alternative time to use method one would be when one was changing their hook or lure and had to retie the knot anyway.

The weight can then be cast to its desired location as one would cast a traditional fishing line weight without fear of pre-mature release of the weight. Removal of the weight is the same regardless of method of attachment. The weight is placed in water and instantly or over time the water-soluble adhesive tape 18 will dissolve depending on the number of layers of tape used. At this time the 2 bodies 10 will separate and the line will come free as the 2 bodies sink away from the line.

Conclusion, Ramifications, and Scope

Accordingly, the reader will see that the this fishing line weight which instantly or over time detaches from fishing line upon contact with water can be used to cast a bait or lure easily and conveniently, and suffers none of the disadvantages of fishing with traditional line weights. In addition, the weight is friendly to the environment with no toxic materials used, yet another advantage over traditional line weights which are made of lead. The product requires no special knowledge to use, and no special equipment to maintain. Furthermore this invention is durable, and comes pre-assembled, so that all one has to do when using it is to attach it to the line and cast, just as they would do with a traditional line weight.

While my above description contains many specificities, these should not be construed as limitations on the scope of the invention, but rather as an exemplification of one preferred embodiment thereof. Many other variations are possible. For example, the weight does not need to be made of two equal halves. There could be only one body, or multiple bodies. The material to form the body could be made of any substance other than clay, although the material would preferably be non-toxic to the environment and negatively buoyant. Pre-made water-soluble adhesive tape does not need to be used. Any material which would bind the bodies or body to the line, still allow for casting in a secure manner, that was not complicated to use, and would still allow the weight to release once contact with the water was made would suffice. The embodiment could be any size as well. The only stipulation on size is that it be large enough to contain adequate weight to cast the bait the desired distance. Color is unimportant. The bodies and the water-soluble tape can be of any color or pattern or combinations thereof. The methods of attachment to the line is also unimportant as long as the line stays attached to the weight in such a manner that it withstand the rigors of casting. The amount and shape of the body, and or bodies does not matter as long as they provide a means to be attached to the line, and they instantly detach from the line when coming in contact with the water.

Although the description above contains many specificities, these should not to be construed as limiting the scope of the invention but as merely providing illustrations as some of the presently preferred embodiments of this invention. For example the bodies can be of of different shapes, such as circular, square, triangular, etc. The groove can be of differing shapes and diameters, the method of attachment to the line can vary, and the water-soluble material may be made of different substances. Thus the scope of the invention should be determined by the appended claims and their legal equivalents, rather than by the examples given.

SEQUENCE LISTING

Non-Applicable

I claim:

1. A line weight which detaches from said line upon water contact comprising:

a) two halves such that when said two halves are joined together said weight is formed with a hole to allow said line to be passed through said weight, b) a water soluble binding layer encircling said weight in a manner that holds said weight together, whereby said line is attached to said weight though said hole in said weight until water contact.

2. The two halves of claim 1 wherein said two halves are identical.

3. The water soluble binding layer of claim 1 wherein said water soluble binding layer is composed of water soluble adhesive tape.

4. The water soluble binding layer of claim 1 further including said water soluble binding layer encircling said weight in one or more layers.

5. The water soluble binding layer of claim 1 wherein said water soluble binding layer dissolves in a consistently predictable amount of time based on the number of said water soluble binding layers encircling said weight.

* * * * *